US006344727B1

United States Patent
Desai et al.

(10) Patent No.: US 6,344,727 B1
(45) Date of Patent: Feb. 5, 2002

(54) CHARGER HAVING A DATA STORE AND DATA LINK

(75) Inventors: Dipiti Desai; Grant Harries Lloyd, both of Lawrenceville, GA (US); Richard Liu, Beijing (CN); Rebecca Lefebvre, Alpharetta, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/799,436

(22) Filed: Mar. 5, 2001

(51) Int. Cl.$^7$ .................................................. H02J 7/00
(52) U.S. Cl. ....................................... 320/107; 320/115
(58) Field of Search ............................... 320/107, 114, 320/115; 381/334; 455/569

(56) References Cited

U.S. PATENT DOCUMENTS

| | | | | |
|---|---|---|---|---|
| 5,754,962 A | * | 5/1998 | Griffin | 455/569 |
| 6,008,620 A | * | 12/1999 | Nagano et al. | 320/106 |
| 6,114,836 A | * | 9/2000 | Hagiwara et al. | 320/132 |
| 6,246,211 B1 | * | 6/2001 | Dalton et al. | 320/114 |
| 6,246,212 | * | 6/2001 | Takimoto et al. | 320/115 |
| 2001/0004397 A1 | * | 6/2001 | Kita et al. | 381/334 |

* cited by examiner

*Primary Examiner*—Gregory Toatley
(74) *Attorney, Agent, or Firm*—Philip H. Burrus, IV

(57) ABSTRACT

A battery charger that includes a data store that can receive, store, and send data files to other computer devices. The battery charger can specifically receive, send, and store multimedia files such as those in MP3 format. The battery charger has a charger platform with at least a charger main processor, a data store (memory), a charged device interface, and a charge control resident thereupon. The battery charger also includes a power link for selectively providing electricity to the charge control of the charger, and a data link for sending and receiving data from the charger main processor. The charger main processor selectively sends and receives data through the data link and stores and retrieves the data from the data store.

4 Claims, 1 Drawing Sheet

CHARGER HAVING A DATA STORE AND DATA LINK

TECHNICAL FIELD

This invention relates generally to charging devices for rechargeable batteries, and more specifically to a desktop charger that has a data link to a computer or other data transfer interface.

BACKGROUND

Desktop chargers provide power to electronic devices, such as a cellular telephone. The charger typically couples a common power source, like a 120V, 60 Hz AC outlet, to the electronic device. The charger conductively connects to the electronic devices, either through a simple male-female plug interface or through the touching of conductive contacts, and selectively provides a current to the rechargeable battery of the electronic device. A properly designed charger will automatically provide the proper voltage and current to fully charge a particular battery per the manufacturer's specifications.

Some desktop chargers have a computer platform that allows data communication with either the computer system of the device or the processor of the actual rechargeable battery. Such data transferred typically concerns the operational data for the battery, such as the charge parameter specification, and does not involve any non-functional data. Consequently, the computer platforms of chargers have minimal if any memory or data store because storage is not required for normal charging operation.

There are now many types of data files that are utilized for specialized applications, and many of the new file formats are for multimedia applications. One such format is MP3, which is a compression format used in the creation of music data files. MP3 files can be exchanged as regular data; however, the MP3 file requires specific hardware and software to be used in order to play the music contained in the data. Therefore, for a person to effectively transfer music through the use of MP3 files, a separate specialized device is typically used that can readily transfer MP3 files, and can then play the music contained therein, such as the Rio player of Diamond Multimedia.

Accordingly, it would be advantageous to provide a battery charger that has the ability to receive, store, and send data, particularly in multimedia format, where the usage of the multimedia format data would otherwise require a separate device.

DETAILED DESCRIPTION OF THE INVENTION

Figure 1:
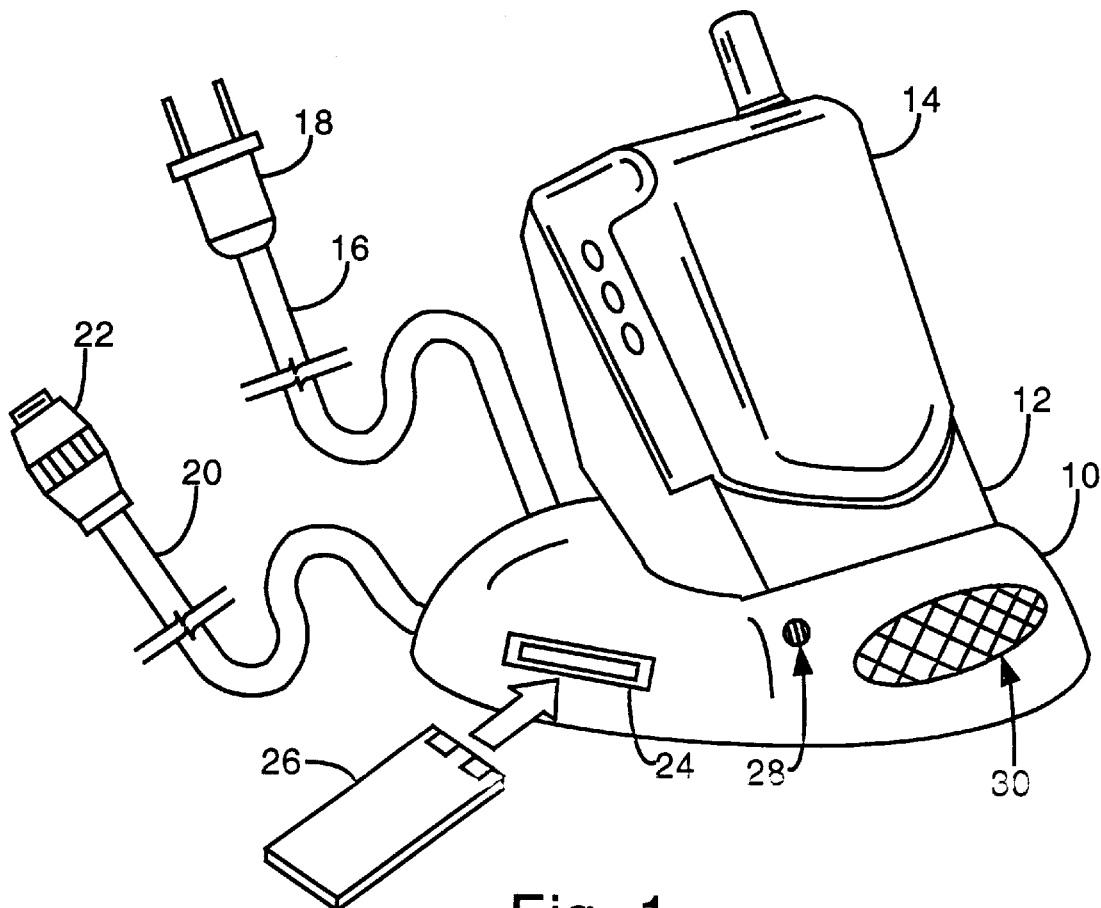
FIG. 1 is a perspective view of one embodiment of the battery charger with a cellular telephone being held and charged in the charged device interface.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

FIG. 1 illustrates a battery charger 10 having a physical charged device interface 12 with a cellular telephone 14 held in the device interface 12. The charged device interface 12 is shown here as a cradle that holds the cellular telephone 14 in place while it is charged. However, other cradle arrangements, such as a dual-pouch charger which holds and charges a cellular telephone and one or more rechargeable batteries, and other interfaces between cellular telephones and other electronic devices can be used in the present invention as the primary inventive element is the computer architecture of the battery charger 10.

The battery charger 10 further has a power link 16 and a data link 20. The power link 16 is shown here as a male plug 18 for a standard 120V, 60 Hz AC outlet, which is common in North America. The data link 20 is shown here as a data cable having a serial plug 22 for fitting in a serial port of a computer, which is well known in the art to support peripheral devices. The data link 20 allows communication between at least the battery charger 10 and the computer, and can also allow communication between the cellular telephone 14 or other electronic device being charged and the computer through the data link 20. The data link 20 is alternately accomplished via a wireless electronic link, either in radio-frequency (RF) or infrared, as are commonly used in the art in such devices as personal digital assistants (PDAs) and wireless telephony.

The data link 20 is preferable for inclusion in the battery charger 10 so that data, preferably MP3 and other multimedia files, can be transferred to and from a computer to the battery charger 10. However, battery charger 10 is embodied with a secondary storage interface, which is shown here as a memory stick interface 24 for receiving memory stick 26 which can have data on the memory stick 26 that is downloaded into the battery charger 10, or the battery charger 10 can upload data on to the memory stick 26. When embodied with the secondary storage interface 24, the battery charger 10 has a secondary method to receive data from external sources.

The battery charger 10 is further embodied with a microphone 28 and a speaker 30 for the creation and audible broadcasting of audio files. The microphone 28 can record voice or other sounds to the battery charger platform 40 (FIG. 2) for storage or immediate playback. The speaker 30 can play the sounds recorded from the microphone 28 or can play other audio files, such as MP3 files. The use of the microphone 28 and/or speaker 30 is only an enhancement of the battery charger 10 and not necessary for the functionality of the data storage and transmission.

Figure 2:
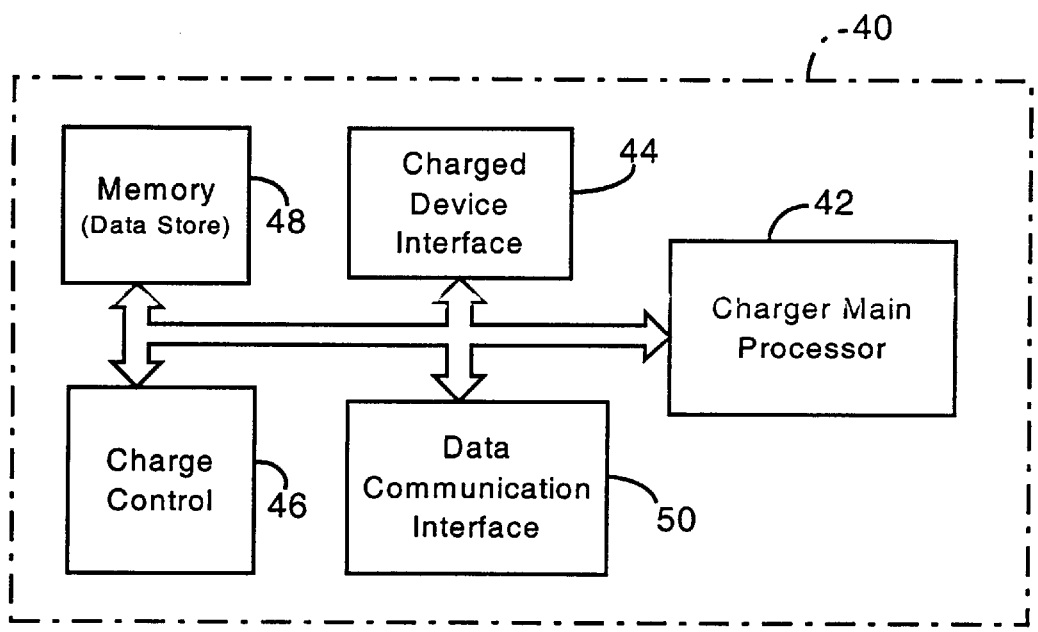
FIG. 2 is a block diagram of the battery charger platform with various components resident on the platform illustrated.

With reference to FIG. 2, there is illustrated the preferred embodiment of the battery charger platform 40 which has at least a charger main processor 42, a data store or memory 48, a charged device interface 44, a charge control 46, and a data communication interface 50 resident thereupon. The memory 48 (or data store) is shown as resident on the computer platform 40, but the memory 48 can alternately be resident on main processor 42 or any other component of the charger platform 40. The memory 48 or data store can be any type of permanent or semipermanent electronic storage device, such as RAM, ROM, or EPROM. The only limitation is that the memory 48 must be readily accessible by the charger main processor 42 for storage and retrieval of data. Further, the data communication interface 50, which is the data conduit for the data link 20 and the secondary storage interface 24, if present, can also be resident on the main processor 42.

The charged device interface 44 conductively interfaces with the device, such as cellular telephone 14, and the rechargeable battery of the device. The charge control 46 selectively provides electricity to the charged device interface 44 (or interface 12 in FIG. 1) to charge and/or communicate the device connected to the charged device interface 44, such as the cellular telephone 14 being seated in the cradle. The power link 20 is in conductive connection to the charge control 46 such that the power link 20 selectively provides electricity to the charge control 46 for the control of the charge parameters of the rechargeable battery of the device. The charge control 46 can include the hardware and software to control the charging of the battery, or alternatively, the software can be resident in the memory 48 and executed on the main processor 42. Furthermore, any control program for any of the components of the charger platform 40 can be resident in the memory 48 and executed on the charger main processor 42 thus giving the main processor 42 full control over the platform and activities occurring thereupon.

The data link 16 communicates with the data communication interface 50 and sends and receives data from the charger main processor 42. The charger main processor 42 can then selectively store and receive data, such as MP3 files, in the memory 48 and then retrieve the data from the memory 48 when needed. The data communication interface 50 can also include the secondary storage interface (such as memory stick interface 24) to retrieve and store data on a secondary media, such as a floppy disk, memory stick 26, and the like. The secondary storage media, such as memory stick 26, can also provide new data to the battery charger 10 that was not originally stored by the battery charger 10, e.g. a new song in MP3 format to be loaded on to the charger main processor 42.

The charger main processor 42 can further transfer the multimedia files to the device, if the device has the requisite storage and functional capabilities. The cellular phone 14 of FIG. 1 typically does not have the requisite functionality to execute multimedia files, such as MP3 files, but other portable electronic devices, such as PDAs, do have such capability, and the present inventive battery charger 10 can thus transfer multimedia files to the multimedia-capable device for storage on the device. In this embodiment, if a secondary storage interface 24 is used, the data link 20 may be unnecessary as a user can move multimedia files from a secondary media, such as memory stick 26, to the battery charger 10 via the secondary storage interface 24, and then to a storage on a multimedia-capable device interfaced with the battery charger 10.

In an alternate embodiment, the components required to transfer and use the data files, and particularly MP3 data files, can be in a separate modification component, which can then interface with the charger 10 and provide the memory 48 and/or the data communication interface 50 to the charger platform 40. The modification component could be in the same shape as the cradle-shaped device interface 12 of FIG. 1, and the modification component will first fit into the battery charger 10 and make the same data and power contacts that the device, such as cellular telephone 14, would otherwise make. The modification component then can interact with the battery charger 10 to provide the functionality of downloading and uploading files, without the device present. The modification component could also include a cradle or other interface that interfaces the device, such as a cradle for cellular telephone 10, and provides requisite conductive contacts to interface with the device. The device can communicate with the charger platform 40 through the modification component and can also be charged by the charge control 46 of the charger platform 40. In such embodiment, an otherwise common battery charger with a charger platform having limited processing capability can be modifiable with a modification component (which does not require a device interface) to download, store, and upload MP3 or other multimedia files and remove the need for another device to perform those functions.

The present invention provides a user tremendous simplification and economy in having the battery charger 10 also perform as multimedia device. The present invention removes the need for another device attached to a computer system as the battery charger 10 can perform both as a charging function and as a multimedia storage and player (depending on the embodiment). Further, the secondary storage interface 24 allows a user to store MP3 or other multimedia files for future use in either the battery charger 10 or other multimedia device that can read MP3 files from the secondary storage media.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A battery charger, comprising:
    a charger platform having at least a charger main processor, a data store, a charged device interface and a charge control resident thereupon, the charged device interface conductively icing with a device hiving a rechargeable battery, and the charge control selectively providing electricity to the charged device interface to charge a device connected to the charged device interface,
    a power link for selectively providing electricity to the charge control of the charger; and
    a data link for sending and receiving data from the charger main processor, wherein the charger main processor selectively sends and receives data through the data link, and the charger main processor further selectively stores and retrieves data from the data store;
    wherein the device is selected from the group consisting of cellular phones and personal digital assistants; further wherein the charger main processor selectively stores and retrieves data in a multimedia format.

2. The battery charger of claim 1, further comprising a secondary storage interface for allowing data to be stored upon and read from a secondary storage medium.

3. The battery charger of claim 1, wherein the charger main processor selectively stores and retrieves data in MP3 format.

4. The battery charger of claim 1, wherein the charger further includes a speaker and a microphone, the speaker and microphone being controlled by the charger main processor.

* * * * *